United States Patent
Turi et al.

(10) Patent No.: US 9,214,017 B2
(45) Date of Patent: Dec. 15, 2015

(54) COFFEE MACHINE AND BREWING ASSEMBLY FOR A COFFEE MACHINE

(75) Inventors: Mariano Turi, Zurich (CH); Heinz Vetterli, Wangen (CH)

(73) Assignee: FRANKE Kaffeemaschinen AG, Aarburg (CH)

( * ) Notice: Subject to any disclaimer, the term of this patent is extended or adjusted under 35 U.S.C. 154(b) by 619 days.

(21) Appl. No.: 13/591,277

(22) Filed: Aug. 22, 2012

(65) Prior Publication Data

US 2013/0047862 A1 Feb. 28, 2013

(30) Foreign Application Priority Data

Aug. 22, 2011 (DE) .......................... 10 2011 110 793

(51) Int. Cl.
```
A47J 31/00    (2006.01)
G06T 7/00     (2006.01)
A47J 31/36    (2006.01)
A24C 5/34     (2006.01)
B65B 19/30    (2006.01)
B65B 19/32    (2006.01)
```
(52) U.S. Cl.
CPC ............. *G06T 7/0004* (2013.01); *A24C 5/3412* (2013.01); *A47J 31/3614* (2013.01); *G06T 7/0083* (2013.01); *B65B 19/30* (2013.01); *B65B 19/32* (2013.01); *G06T 2207/20168* (2013.01); *G06T 2207/30128* (2013.01)

(58) Field of Classification Search
CPC ............................... A47J 31/3614; A47J 31/36
USPC ..................... 99/302 P, 297, 289 R
See application file for complete search history.

(56) References Cited

U.S. PATENT DOCUMENTS

| | | | | |
|---|---|---|---|---|
| 5,333,537 | A * | 8/1994 | Lussi et al. | ...................... 99/287 |
| 7,223,427 | B2 * | 5/2007 | Knepler | ........................ 426/231 |
| 8,124,150 | B2 * | 2/2012 | Doglioni Majer | ............ 426/231 |
| 8,240,245 | B2 * | 8/2012 | Doglioni Majer | ........... 99/302 P |
| 8,776,672 | B2 * | 7/2014 | Wuthrich | .................... 99/289 R |

FOREIGN PATENT DOCUMENTS

| | | |
|---|---|---|
| DE | 9115998.9 | 6/1993 |
| DE | 602004005313 | 12/2007 |
| EP | 0528759 A1 | 2/1993 |
| EP | 0658330 | 4/1998 |
| EP | 0937432 A1 | 8/1999 |
| EP | 1535554 A1 | 6/2005 |
| EP | 1774883 | 4/2007 |
| EP | 2105075 A1 | 9/2009 |

* cited by examiner

Primary Examiner — Reginald L Alexander
(74) Attorney, Agent, or Firm — Volpe and Koenig, P.C.

(57) ABSTRACT

A brewing assembly for a coffee machine, which brewing assembly includes a brewing module with a brewing head, an upper and lower closure element, and a drive module with at least one linear guide element. The brewing head has a cylindrical brewing chamber, which can be closed by the upper and lower closure elements and cooperates with the linear guide such that the brewing head is displaceable linearly in the brewing assembly. The drive unit also includes a motor drive for the linear guide element. The brewing head and at least one of the two closure elements with at least a brewing chamber are arranged in the brewing module in a linearly displaceable fashion. The brewing module is arranged detachably in or on the drive unit such that when it is in or on the drive unit at least the brewing head is linearly displaceable via the linear guide element.

17 Claims, 8 Drawing Sheets

COFFEE MACHINE AND BREWING ASSEMBLY FOR A COFFEE MACHINE

CROSS-REFERENCE TO RELATED APPLICATIONS

This application claims the benefit of German Patent Application No. 102011110793.6, filed Aug. 22, 2011, which is incorporated herein by reference as if fully set forth.

BACKGROUND

The invention relates to a coffee machine and a brewing assembly for a coffee machine.

Coffee machines for an automated production of a coffee drink typically comprise a water heating unit, a coffee powder supply unit, and a brewing assembly. For the production of a coffee drink powdered coffee is fed from the coffee powder supply unit and heated water from the water heating unit to the brewing assembly and in said unit the brewing process occurs to prepare the coffee drink.

Typical brewing assemblies comprise a brewing head, an upper closure element, a lower closure element, and at least one linear guide element. The brewing head comprises a cylindrical brewing chamber to accept the powdered coffee, with here the brewing chamber can be closed by the upper and the lower closure elements such that a brewing chamber is formed to brew the coffee drink.

A brewing assembly is known from EP 1 774 883 A1 in which the brewing head is embodied cooperating with the linear guide element such that the brewing head is displaceable via the guide element linearly in reference to the brewing head. In this brewing assembly of prior art the guide element is formed by two spindles, rotational by a motor, by which guide element the brewing head and the lower closure element can be moved up and down in a linear motion.

Coffee machines for the automatic production of a coffee drink are particularly used in the restaurant field, but increasingly also applied in private settings. The brewing assembly here represents an element subject to particularly severe mechanical wear and tear because the ground coffee is compressed in the brewing chamber and subjected to hot water under high pressure.

In the above-mentioned EP 1 774 883 A1 it is therefore suggested that the brewing head is detachably fastened at the two spindles such that for cleaning, maintenance, and for the exchange of the brewing heat it can be removed.

SUMMARY

The present invention is based on the objective of providing a coffee machine of the type mentioned at the outset which simplifies the cleaning and maintenance tasks and particularly the exchange of the parts subject to wear and tear and/or allows the performance thereof in a shorter period of time, and lowers the maintenance and/or upkeep costs.

This objective is attained in a brewing assembly as well as a coffee machine according to the invention. Advantageous embodiments of the brewing assembly and coffee machine are described below and in the claims. Here, the wording of all claims is explicitly included in the description by way of reference.

A brewing assembly according to the invention is embodied for a coffee machine and comprises a brewing head, an upper closure element, a lower closure element, and at least one linear guide element. The brewing head comprises a cylindrical brewing chamber, which can be closed by the upper and the lower closure elements, and the brewing head is embodied cooperating with the linear guide element such that the brewing head can be displaced via the guide element in a linear fashion.

As known from prior art, using the brewing assembly according to the invention, after the supply of powdered coffee into the brewing chamber and by a linear displacement of at least the brewing head and closure of the brewing chamber via the upper and the lower closure elements, here a coffee drink can be brewed in the brewing chamber by the supply of heated water subjected to pressure.

It is essential that the brewing group comprises a drive unit and a brewing module.

The drive unit comprises the linear guide element and a motor drive for the linear guide element. The brewing module comprises the brewing chamber and at least one of the two closure elements, with at least the brewing chamber being arranged linearly displaceable in the brewing assembly.

The brewing module is arranged detachably in and/or on the drive unit such that when the brewing module is arranged in and/or on the drive unit the brewing head is linearly displaceable via the linear guide element of the drive unit.

The invention is based on the acknowledgment of the applicant that with regards to maintenance, cleaning, and the exchange of parts subject to wear and tear a brewing assembly can be divided into two categories.

The drive unit comprises the linear guide element and a motor drive for the linear guide element. Accordingly, the elements of the drive unit must be embodied in a stable fashion, in order to apply and compensate the forces occurring during the linear guidance and the displacement. These mechanical components can be embodied long-lasting using components known per se such that compared to the components described in the following they represent no parts subject to wear and tear.

The brewing module comprises a brewing head and at least one of the two closure elements. These elements are subject to pressure applied during the compression of the powdered coffee, the brewing process by impinging the powdered coffee with hot water under high pressure, and the contamination by powdered coffee and thus they require cleaning at regular intervals and must frequently be exchanged due to wear and tear.

By the detachable arrangement of the brewing module and/or the drive unit, the user and/or the professional personnel therefore can remove said brewing module from the brewing assembly in an easy and time-saving fashion and clean it and/or run maintenance and/or exchange it for another brewing module. This way, the maintenance of the coffee machine can occur in a time-saving fashion. Particularly the exchange of the brewing module can be performed with the operation of the coffee machine being interrupted for only a few seconds such that the time for maintenance and/or cleaning of the brewing module on the one side and the time for interrupting the operation of the coffee machine for maintenance on the other side are decoupled.

The brewing assembly according to the invention allows therefore for the first time to perform maintenance of the brewing assembly in the shortest possible time, in which by exchanging the brewing module the relevant parts of the brewing assembly subject to maintenance and wear and tear can be removed and particularly exchanged.

An essential advantage of the brewing module according to the invention is therefore that the brewing module comprises the components of the brewing assembly typically considered subject to wear and tear. This typically comprises one or more of the following elements: seals of the upper and/or lower closure elements, seals of the coupling elements, and/or a coffee sieve at the upper closure element.

Preferably the brewing module comprises the upper and the lower closure element. As described above, the following elements are particularly subject to wear and tear due to the impingement of the powdered coffee with pressure in the brewing chamber. This applies, in addition to the brewing head, to both the upper and the lower closure element, so that preferably both closure elements can be removed as components of the brewing module together with said brewing assembly.

Preferably one of the closure elements, preferably the upper closure element, is arranged fixed at the brewing module and the other closure element is arranged at the brewing module linearly displaceable together with the brewing head.

This way, via the drive and the linear guide element the drive unit and the other closure element are displaced in the direction of the locally fixed closure element such that here a closure of the brewing chamber of the brewing head and a compression of the powdered coffee is achieved.

Preferably the linear guide element of the drive element comprises a first mechanical coupling element and the brewing head of the brewing module comprises a second mechanical coupling element. The coupling elements are embodied and arranged such that in a brewing module arranged in and/or at the drive unit the two coupling elements are mechanically coupled so that a linear displacement force can be transmitted via the guide element to the brewing head. Accordingly, using the mechanic coupling elements a detachable connection between the drive unit and the brewing module is ensured in a simply designed fashion which allows the transfer of the linear displacement force from the drive unit to at least the brewing head and preferably one of the two closure elements.

In particular, it is advantageous for the coupling element of the brewing module to comprise at least one appendage and the coupling element of the linear guide element to comprise at least one corresponding receiver for the appendage such that by a simple design the mechanical coupling is achieved by the arrangement of the brewing module in and/or at the drive unit. Here, it is particularly advantageous that the receiver is embodied for the detachable receipt of the appendage. In particular, the embodiment of a coupling element as an receiver for the form-fitting receiving of the other coupling element is included in the scope of the invention.

Preferably the coupling element of the brewing module is embodied as a rod-like element. It is particularly advantageous for the rod-like element to be arranged approximately perpendicular in reference to the linear direction of displacement of the brewing head. This way the linear displacement force can be transferred in a simply designed fashion, from the motor drive via the linear guide element of the drive unit and via the rod-like element to the brewing head.

Preferably the coupling element of the brewing module extends perpendicular in reference to the linear direction of displacement of the brewing chamber, at least over the width of the brewing chamber, so that the area of the brewing chamber to be impinged with pressure is supported over the entire width by the coupling element when during the compression of the powdered coffee by the linear displacement. In particular it is advantageous for the coupling element of the brewing module to be formed from metal, so that this element of the brewing module essentially (responsible) for transferring force between the drive unit and the brewing head is formed from a stable and lasting material.

Preferably one of the closure elements, particularly preferred the lower closure element, is additionally embodied and arranged as an ejection ram for ejecting used coffee powder from the brewing chamber. This closure element therefore fulfills on the one hand the function to close the brewing chamber at one side when the powdered coffee is compressed and the coffee is brewed. Furthermore, this closure element fulfills the function, after the coffee drink has been prepared, to further penetrate into the brewing chamber and thus to eject the used coffee powder in the sense of an ejection ram from the brewing chamber at the side now no longer closed by the other closure element.

In particular it is advantageous that in an ejection position the brewing head and the closure element embodied as an ejection ram are arranged at the brewing module pivotal about a pivotal axis aligned perpendicular in reference to the linear direction of displacement. This way, after the coffee drink has been produced the brewing head and the ejection tapped can be displaced in a simply designed manner linearly into an ejection position and pivoted about the above-mentioned pivotal axis perpendicular in reference to the linear direction of displacement such that an ejection of the coffee powder occurs via the closure element embodied as an ejection ram with the risk for contaminating the brewing assembly by ejected coffee powder being reduced.

Preferably the brewing module is arranged detachable in one piece in and/or at the drive unit. The brewing module therefore represents a structural assembly such that it can be removed from the brewing assembly as one part and thus with a single motion.

Preferably the brewing module is arranged in and/or on the drive unit in a manner detachable without any tools. The user or the maintenance personnel can therefore remove the brewing module of the brewing assembly for maintenance without a tool being required, which frequently cannot be found in such a situation, which leads to delay, here.

Preferably at least one of the elements brewing head, upper closure element, and/or lower closure element is arranged via the quick connect at the brewing module. This way, the respective element of the brewing module, after removal of said brewing module from the brewing assembly, can be removed in a cost-saving fashion and maintained and/or exchanged.

In another advantageous embodiment the upper and/or the lower closure element, preferably both closure elements comprise a fluid connection including a seal to connect a fluid line. In this advantageous embodiment the upper and/or lower closure element are therefore embodied to insert and/or drain a fluid, particularly water, via the fluid connection into the brewing chamber.

Experiments of the applicant have shown that the seals providing a sealing between the fluid lines and the above-described fluid connections are frequently subject to wear and tear as well and/or must be maintained or cleaned. In this preferred embodiment when removing the brewing module from the brewing assembly simultaneously the seals relevant for maintenance are also removed and/or exchanged when the brewing module is exchanged.

Preferably the drive unit comprises spindles that are rotational via the motor drive, which are arranged parallel and spaced apart from each other at the drive unit. In particular it is advantageous that the drive unit and the brewing module are embodied such that the brewing module is arranged in a detachable fashion, at least partially, between the spindles.

This way in a particularly simple and robust design a force transfer of a linear displacement force is realized by rotating the spindles via the motor drive to the displaceable elements of the brewing module, particularly the brewing head. Preferably one coupling element is each arranged at the spindles, and the brewing module comprises two corresponding coupling elements which, upon the assembly of the brewing module in and/or at the drive unit, are mechanically coupled to the receivers arranged on the spindles in order to transfer the linear displacement force. A particularly simply designed embodiment results here when the brewing module comprises a metal rod as the coupling element, which projects at two opposite sides of the brewing module with one end each and the drive unit comprises matching receivers on the spindles for a form-fitting acceptance of one respective end of the rod.

Preferably the brewing module is essentially made from plastic, thus a low-weight and cost-effective embodiment is ensured particularly of the parts subject to wear and tear. It is particularly advantageous that the upper and lower closure element as well as the brewing chamber are formed from plastic. The element of the brewing module most severely subjected to mechanical stress typically represents the coupling element so that preferably the coupling element is embodied from a harder material, particularly preferred from metal.

The objective described at the outset and underlying the invention is further attained in a coffee machine comprising a water heating unit, a coffee powder—supply unit, and a brewing assembly. These elements are embodied cooperating such that in the brewing assembly by the supply of powdered coffee via the coffee powder—supply unit and hot water via the water heating unit, a coffee drink can be produced. This general design of the coffee machine according to the invention is therefore consistent with the design known from automatic coffee makers of prior art. It is essential here that the brewing assembly is formed like the described brewing assembly according to the invention or a preferred embodiment therefrom.

An essential advantage of the brewing assembly according to the invention is the fact that the drive unit, which due to the forces developing must be embodied mandatorily in a robust and stable fashion, due to said stable and robust embodiment is unaffected by wear and tear compared to the other components and thus requires no or only little maintenance and exchange. The elements due to their contact with the ground coffee and the impingement with pressure always being subject to wear and tear can further be produced cost-effectively from plastic, and are arranged in the removable brewing module such that maintenance and exchange can occur in a very short period of time.

Particularly when compressing the ground coffee said ground coffee is impinged with a force inside the brewing chamber of the brewing head, by the movement of the upper and the lower closure elements towards each other reducing the remaining volume in the brewing chamber and this way the compression of the ground coffee occurs. The force required here is provided by a motor drive of the drive unit, which is transferred via the linear guide element of the drive unit to the brewing module, preferably to a closure element, particularly preferred to the lower closure element. This preferably occurs via the mechanic coupling elements embodied as described above.

The counter pressure during the compression of the ground coffee is compensated on the one side by the casing surface of the cylindrical brewing chamber and on the other side by the other closure element, preferably the upper closure element, which is not moved by the motor drive of the drive unit via the linear guide element. Preferably the brewing assembly according to the invention is therefore embodied such that in the drive unit as well as at the drive unit and at the brewing module one contact area each is formed which in and/or on the drive unit contact each other when the brewing module is assembled in order to compensate a counter force particularly during the compression of the ground coffee and/or during the brewing process.

This preferred embodiment therefore has the advantage that the brewing module per se is not mandatorily necessary to show the stability required to apply the counter force during the compression of the ground coffee, particularly when the compression of the ground coffee occurs. Instead thereof, the force occurring can be transferred partially or entirely via the above-mentioned contact areas to the drive unit, which shows appropriate stability.

In particular it is advantageous that the drive unit has a frame and/or a stand comprising a contact area to compensate a pressure and/or a force via a corresponding contact area of the brewing module. In particular it is advantageous for the frame and/or stand to be embodied in a stable fashion, preferably made from metal.

In the above-mentioned preferred embodiment in which the lower closure element is moved via the linear guide element, the contact area of the drive unit is preferably arranged in the upper area of the drive unit and points downwards and correspondingly preferably the contact area of the brewing module is arranged in the upper area, preferably the upper end of the brewing module and points upwards.

In another preferred embodiment the brewing module comprises a marking, which can be scanned automatically via a scanner when the brewing module is arranged in and/or at the drive unit. This marking can particularly be embodied as a barcode, known per se, similarly, other automatically scanned markings are included in the scope of the invention, such as RFID markings. In this preferred embodiment via the scanner specific information can be read about the brewing module respectively used and/or arranged at the drive unit. This way a plurality of advantages develop.

On the one hand, a production date can be determined from the marking and, if applicable, used to inform the user of typical wear periods of the parts.

In particular it is advantageous, though, to adjust the parameters used for preparing coffee to the respective brewing module. Advantageously at least one of the parameters of the following group comprising coarseness, brewing pressure, brewing temperature, amount of water supply during the brewing process, counter pressure when compressing the ground coffee is changed depending on the marking of the brewing module. For this purpose the drive unit and/or the coffee machine comprise a scanner corresponding to the marking so that the marking of the brewing assembly can be scanned via the scanner and forwarded to a control unit of the coffee machine. The control unit is embodied such that depending on the marking the selection is made from one or more of the parameters for coffee preparation.

Here, the scope of the invention includes that tables and/or lists with allocations between the brewing module markings and corresponding parameters for preparing coffee are stored in the control unit. The scope of the invention also includes that the marking itself includes the parameters or equivalent information.

In this advantageous embodiment therefore the brewing process can be adjusted optimally for the respectively used brewing assembly. For example, depending on the size of the brewing chamber, coarseness setting, brewing pressure, and/or brewing temperature can be adjusted. In particular it is possible to embody brewing modules for particular types of drinks, for example brewing modules particularly embodied for espresso and brewing modules particularly embodied for other types of coffee, and to distinguish them by respective markings so that the coffee machine can be easily converted by the exchange of the brewing module from a particularly for the preparation of espresso optimized coffee machine into a coffee machine with greater variability with regards to the coffee variants produced.

BRIEF DESCRIPTION OF THE DRAWINGS

Additional preferred features and embodiments of the invention are described in the following in an exemplary embodiment and explained and described based on the figures. Shown are.

DETAILED DESCRIPTION OF THE PREFERRED EMBODIMENTS

Figure 1:
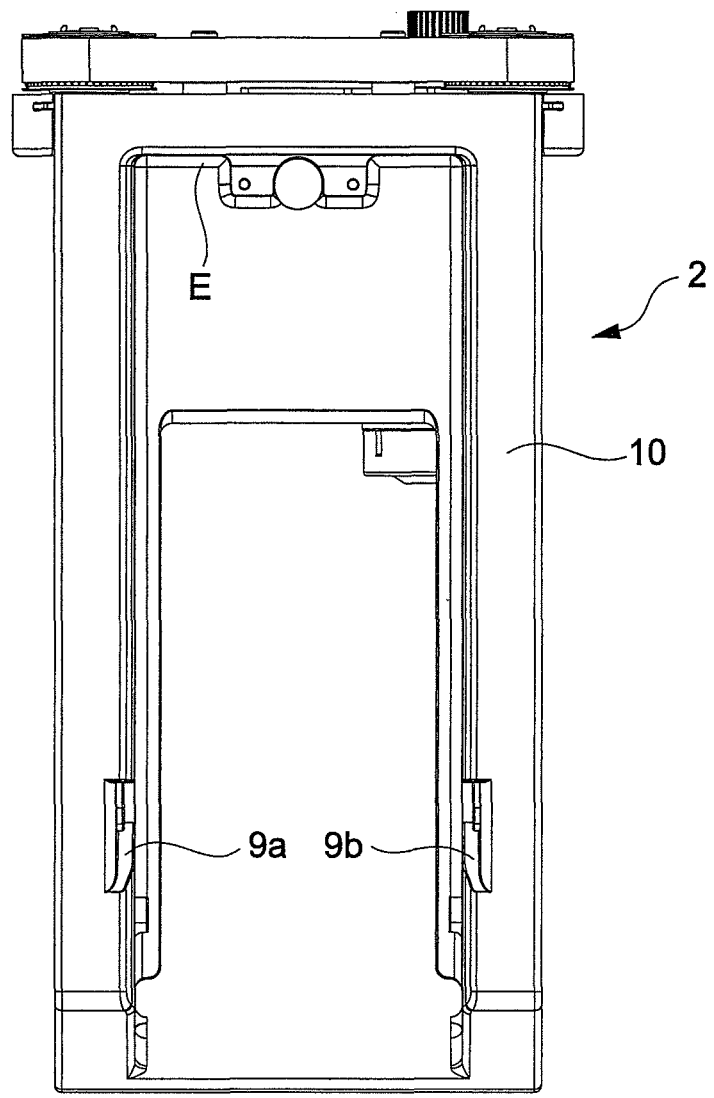
FIG. 1 a front view of a drive unit of an exemplary embodiment of a brewing assembly according to the invention.

In FIGS. 1 through 8 identical reference characters refer to identical elements.

FIGS. 1 through 8 relate to an exemplary embodiment of a brewing assembly 1 according to the invention for a coffee machine.

The brewing assembly comprises a drive unit 2 and a brewing module 3.

The drive unit 2 comprises a linear guide element 4, which comprises two spindles 4a and 4b aligned parallel in reference to each other. Furthermore, the drive unit comprises a motor drive 5 embodied as an electric motor, which is connected via a belt to the two spindles 4a and 4b so that by the motor the spindles can be rotated in the same direction and perpendicular about their axis.

The brewing module 3 comprises a brewing head 6, which includes a cylindrical brewing chamber 6a. Furthermore, the brewing module comprises an upper closure element 7a and a lower closure element 7b.

Figure 4:
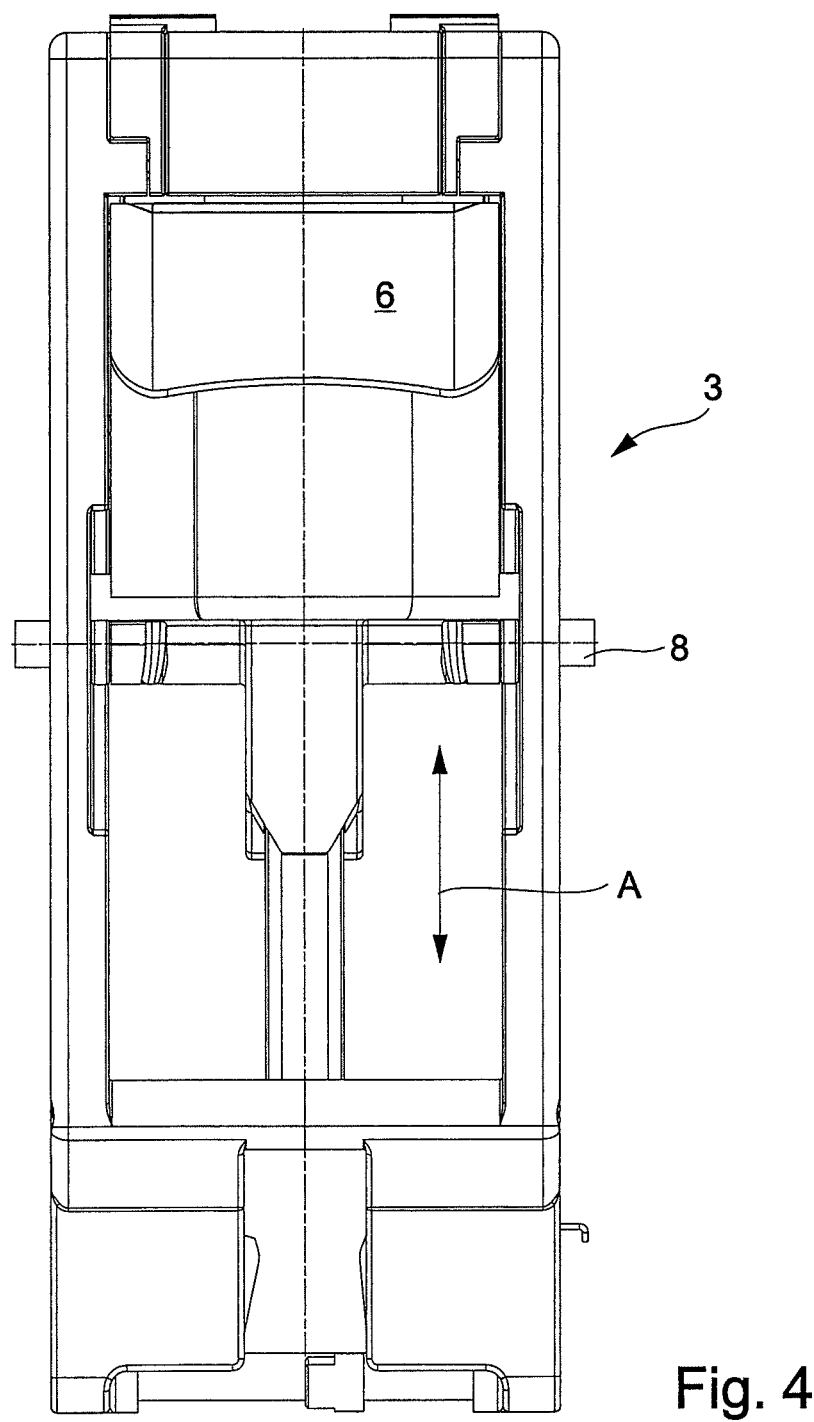
FIG. 4 a front view of a brewing module of the exemplary embodiment of a brewing assembly according to the invention.

The brewing head 6 and the lower closure element 7b are arranged in the brewing module in a linearly displaceable fashion, such as indicated in FIG. 4 by the dual arrow A. The upper closure element 7a is arranged fixed at the brewing module 3, though.

Figure 6:
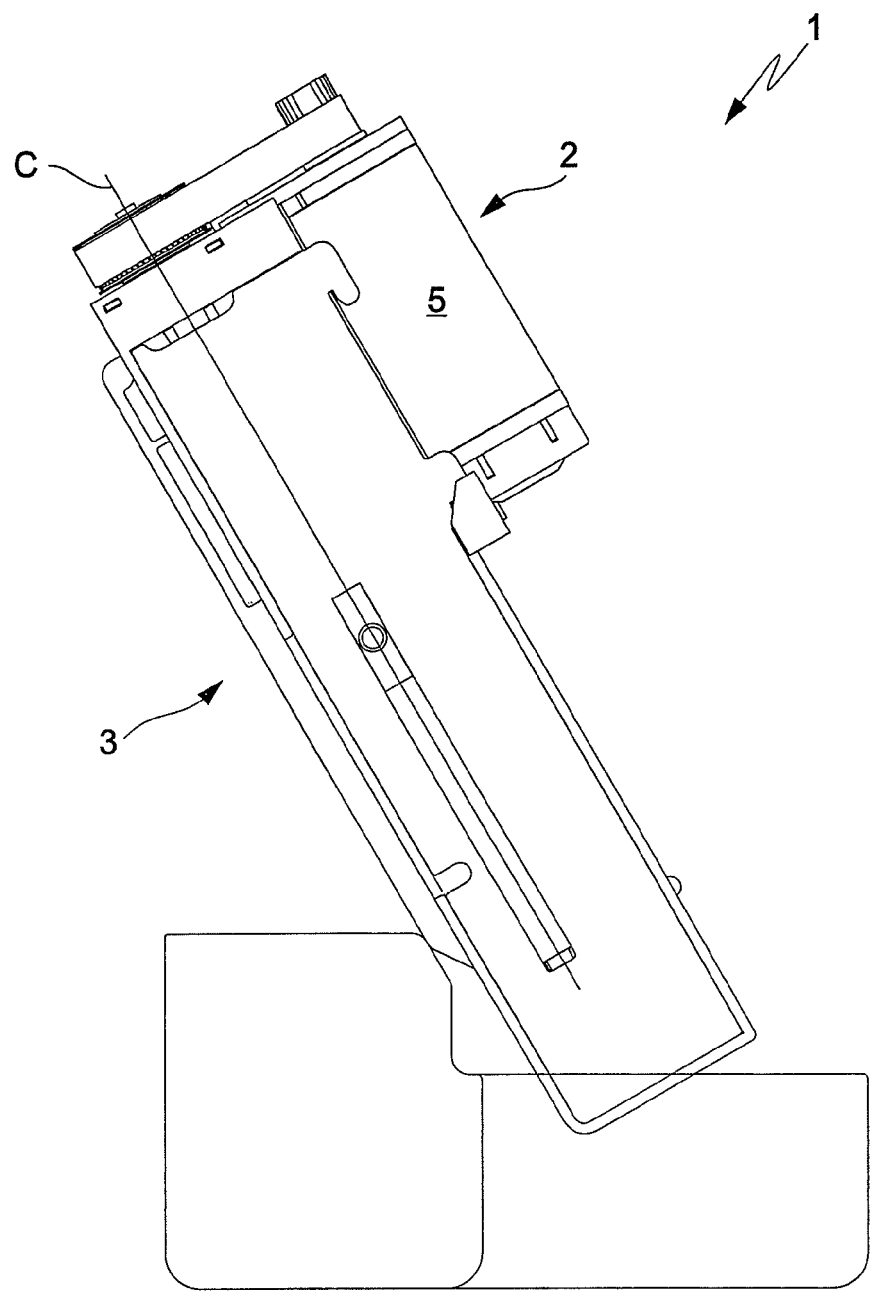
FIG. 6 a side view of the exemplary embodiment of a brewing assembly according to the invention, with the brewing module being inserted in the drive unit.
Figure 7:
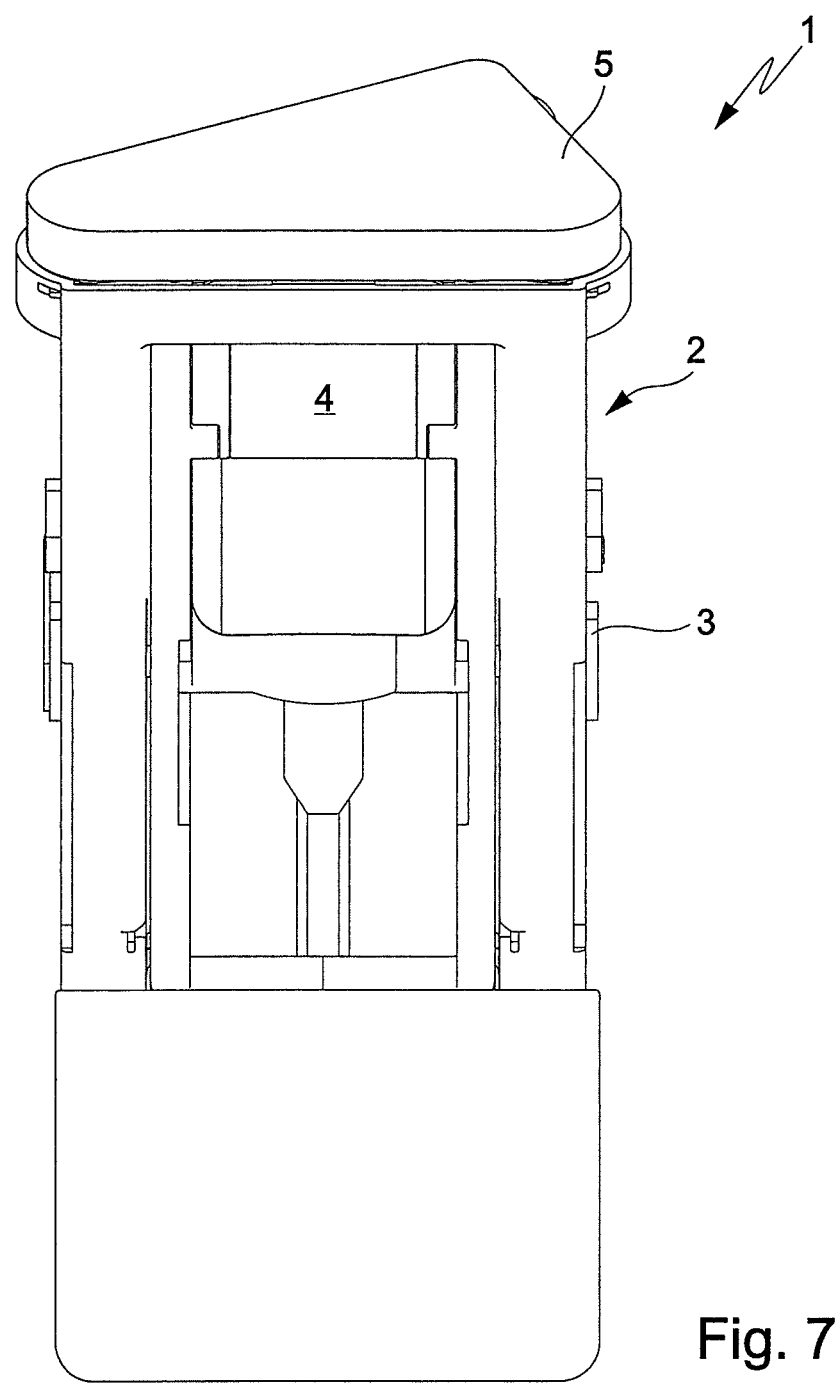
FIG. 7 a rear view of the brewing assembly.

It is essential that the brewing module can be arranged in a partially detachable fashion in the drive unit, as shown in FIGS. 6 though 8.

In brewing modules arranged in the drive unit the brewing head 6 and the lower closure element 7b can be moved up and down by the motor drive 5.

The linear guide element 4 comprises two spindle nuts 4c, 4d, each of which engaging the spindle thread like a comb and guided at a frame of the drive unit 2 such that a translational motion of the spindle nut is possible, however no rotary motion about the respective spindle axis.

Figure 8:
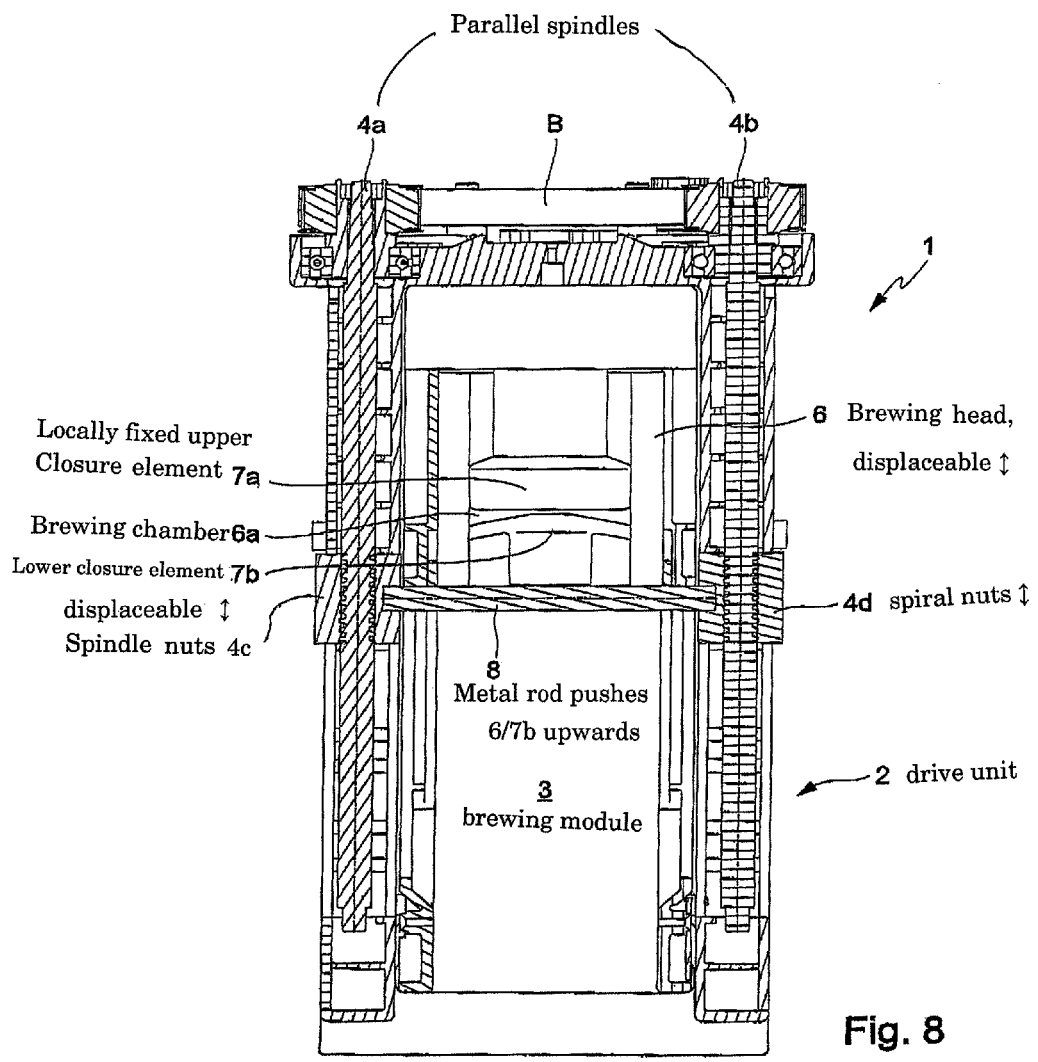
FIG. 8 is a cross-section of the brewing assembly according to line C and perpendicularly in reference to the drawing level in FIG. 6.

The spindle nuts 4c and 4d comprise recesses at the respectively interior side to accept a horizontally extending cylinder, which in the illustrations of FIGS. 1 and 8 can be inserted perpendicular in reference to the drawing level and into said drawing plane, i.e. from the front into the spindle nuts.

Accordingly the brewing module 3 comprises a metal rod 8, which as discernible in FIG. 4 projects beyond a frame of the brewing module 3 towards the right and the left.

The frame of the drive unit 2 in turn comprises a frame for recesses 9a and 9b (see FIGS. 1 and 3) so that when the brewing head is moved to the bottom and the closure element is lowered the ends of the metal rod 8 can be inserted into the corresponding recesses of the spindle nuts 4c and 4d during the insertion of the brewing module 3 into the drive unit 2.

The metal rod 8 is arranged underneath the lower closure element 7b and the brewing head 6 such that when the spindle nuts 4c and 4d are displaced upwards a respective linear displacement force upwards is transferred via the metal rod 8 to the lower closure element 7b and the brewing head 6 and thus both of them are displaceable upwards and downwards by the motor drive 5.

In order to produce a coffee drink the brewing head and the lower closure element 7b are moved downwards by the motor drive 5 so that due to the upper closure element 7a arranged at a fixed location the brewing chamber 6a is open towards the top and accordingly ground coffee can be inserted.

Subsequently, via the motor drive 5, the brewing head 6 and the lower closure element 7b are moved upwards so that the brewing chamber is closed by the upper closure element 7a and furthermore the ground coffee is compressed between the upper and the lower closure elements.

The upper and the lower closure element 7a, 7b, (shown in FIG. 8) each comprise a fluid line 16a, 16b as well as a connector socket 15a, 15b with a seal embodied as an O-ring, connected during operation with corresponding fluid lines of a coffee machine to form fluid connections. Hot water is fed via these lines, including 16a, into the brewing chamber 6a to brew coffee and via the other line 16b the coffee drink is drained to an output opening of the coffee machine.

Except for the metal rod 8 and perhaps screws or similar connection elements the remaining parts of the brewing module 3 are made from plastic. This way the brewing module 3 can be produced in a cost-effective manner.

Although during the production of coffee, particularly during the compression of the ground coffee, considerable forces are applied, particularly in the vertical direction, they are forwarded to the drive unit 2 though, so that the essential stability to generate and/or compensate these forces is given by the drive unit 2.

Figure 2:
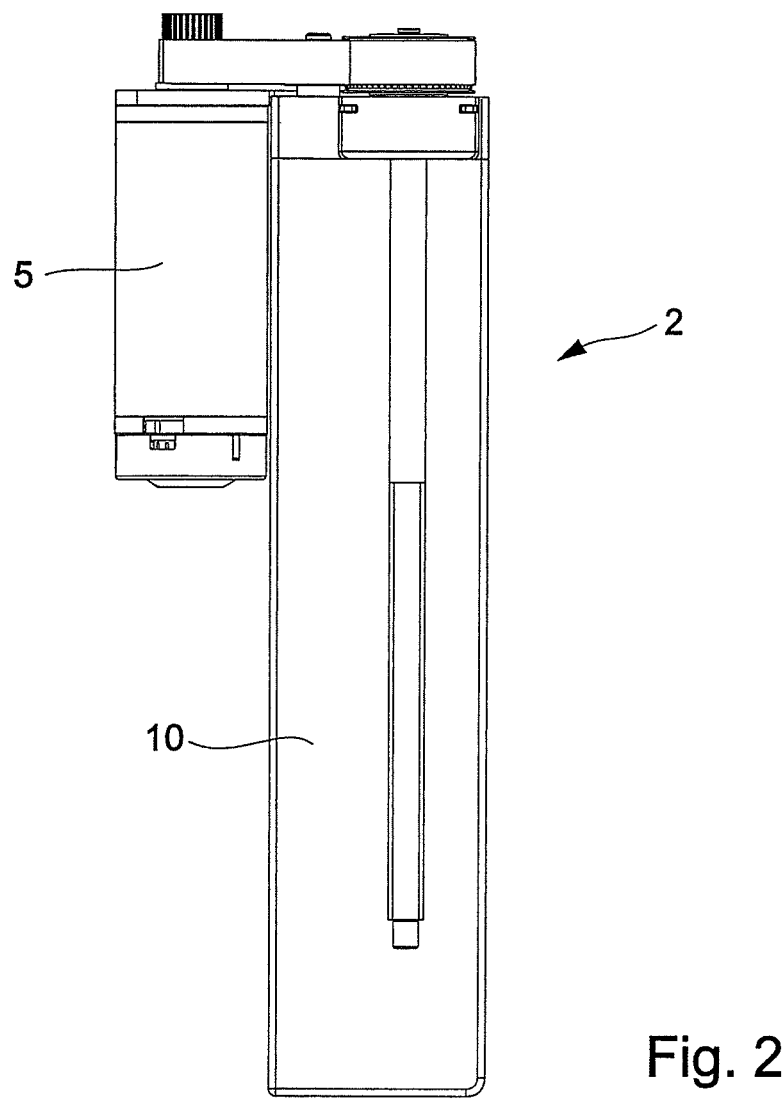
FIG. 2 a side view of a drive unit of the exemplary embodiment of the brewing assembly.
Figure 3:
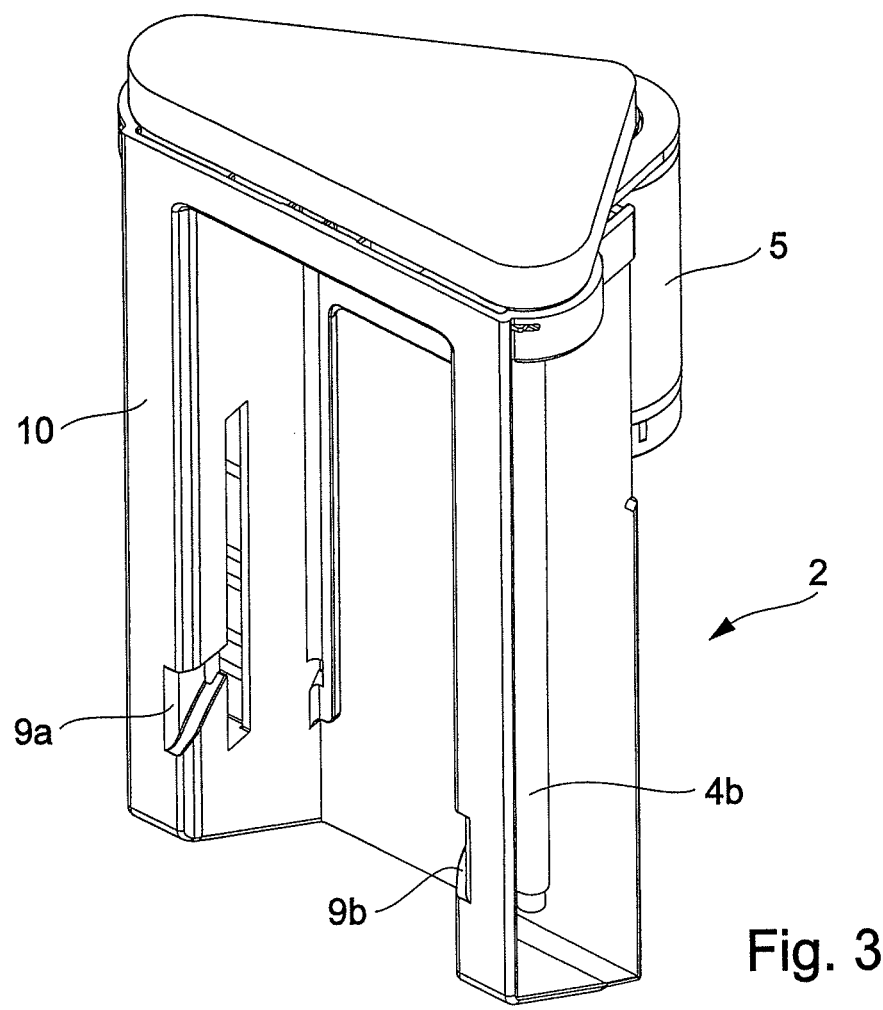
FIG. 3 a top perspective view of the drive unit of the exemplary embodiment.

As discernible from FIGS. 1 through 3, the drive unit 2 has a frame 10 made from metal. The motor drive is arranged at this frame and the spindles 4a and 4b are also supported at the frame 10.

When the brewing module 3 is inserted in the drive unit 2 the brewing module 3 contracts the drive unit 2 in the upper area (see reference character B in FIG. 8).

Figure 5:
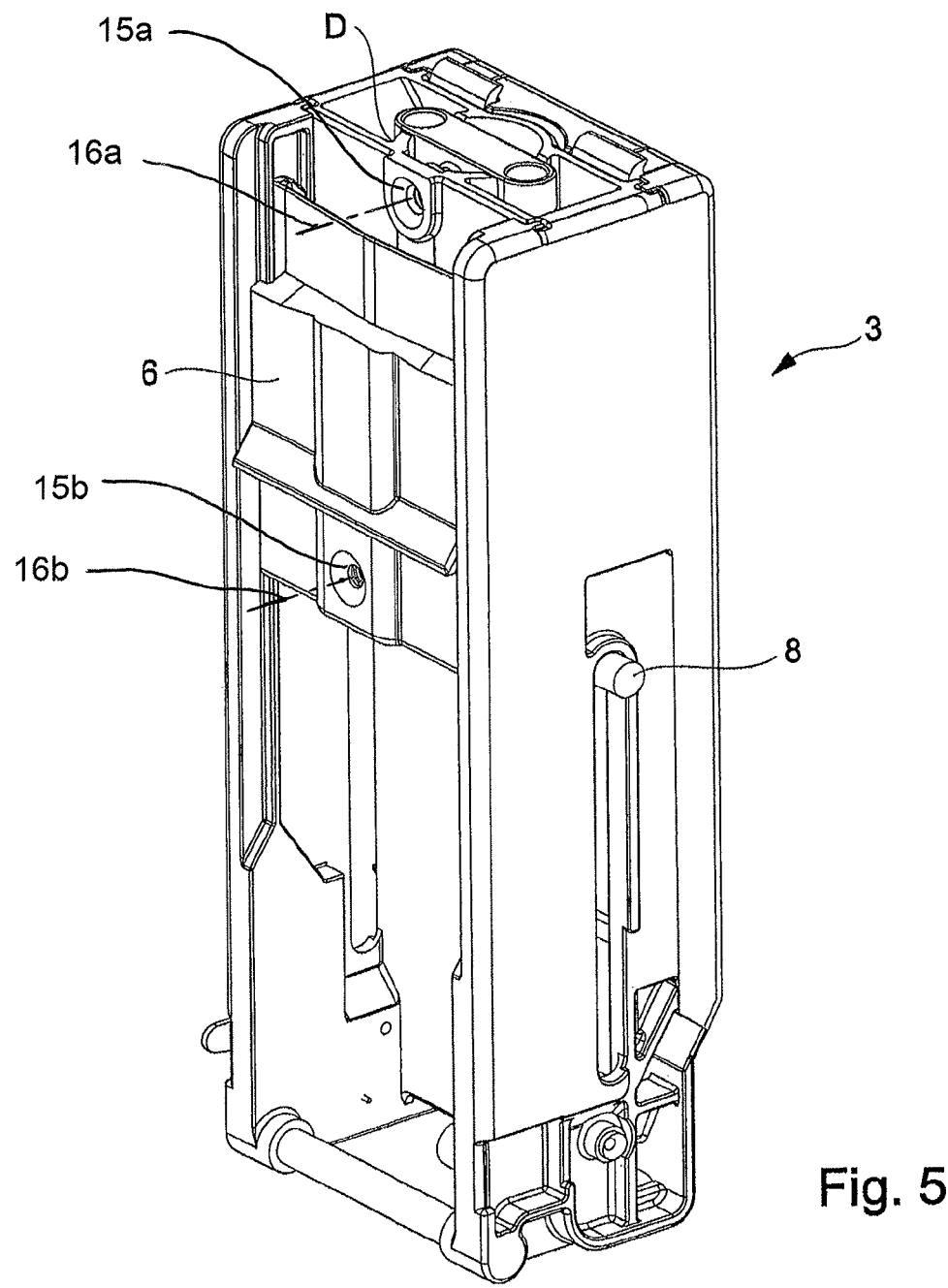
FIG. 5 a perspective view of the brewing module.

Accordingly, the upper areas and bars (for example reference character D in FIG. 5) discernible in the perspective illustration of the brewing module 3 in FIG. 5 contact a contact area of the frame 10 of the drive unit 2, pointing downwards and being marked with the reference character E in FIG. 1. When the ground coffee is now compressed, by the motor drive 5 via the spindles 4a and 4b, the spindle nuts 4c and 4d, the metal rod 8, a force acting in the direction of the upper closure element 7a is transferred upon the lower closure element 7b, while the upper closure element 7a is supported via appropriately embodied walls and bars of the brewing module 3 at the contact area E of the frame 10 of the drive unit 2. The essential stability is therefore provided by the frame 10, the spindles 4a and 4b, the spindle nuts 4c, 4d, and the metal rod 8.

As discernible from FIG. 5, the brewing module 3 is characterized in a marking 11 embodied as a barcode that can be automatically scanned. As discernible from FIG. 3, the drive unit 2 comprises a corresponding scanner (12) so that when the brewing module is inserted in the drive unit the marking 11 can be scanned via the scanner 12. Depending on the data scanned the from the group including coarseness, brewing pressure, brewing temperature, amount of water supply during the brewing process, and the counter pressure during the compression of the ground coffee is selected such that for the respectively used brewing assembly optimal parameters are applied for the production of the drink. Here, the scope of the invention includes that additionally one or more parameters are changed by the user or by other control factors. In particular it is possible that by the detected type of brewing assembly only preferred values and/or ranges are predetermined for one or more parameters.

The invention claimed is:

1. A brewing assembly for a coffee machine, said brewing assembly (1) comprising: a drive unit and a brewing module (3); the brewing module (3) includes a brewing head (6), an upper closure element (7a), and a lower closure element (7b); said brewing head (6) comprising a cylindrical brewing chamber (6a) which can be closed by the upper and the lower closure elements; and the drive unit (2) includes at least one linear guide element (4), and said brewing head (6) being connectable with the linear guide element (4) such that the brewing head (6) is linearly displaceable via the guide element (4) in the brewing assembly (1); said drive unit (2) includes a motor drive for the linear guide element (4); the brewing head (6) and one of the two closure elements and the brewing chamber (6a) are arranged in the brewing module (3) in a linearly displaceable fashion; the brewing module (3) is connected to the drive unit (2) in a detachable manner such that when the brewing module (3) is connected to the drive unit (2), at least the brewing head (6) can be linearly displaced via the linear guide element (4) of the drive unit (2); and the other of the two closure elements is arranged locally fixed on the brewing module (3).

2. A brewing assembly according to claim 1, wherein the liner guide element (4) of the drive unit (2) comprises a first mechanical coupling element and the brewing head (6) of the brewing module (3) comprises a second mechanical coupling element, said coupling elements being arranged such that when the brewing module (3) is connected to the drive unit (2), the two coupling elements are mechanically coupled so that a linear displacement force can be transferred via the guide element (4) to the brewing head (6).

3. A brewing assembly according to claim 2, wherein the coupling element of the brewing module (3) comprises at least one appendage and the coupling element of the linear guide element (4) at least one corresponding receptacle for the appendage, and the receptacle detachably receives the appendage.

4. A brewing assembly according to claim 3, wherein the coupling element of the brewing module (3) is embodied as a rod-shaped element, and the rod-shaped element is arranged approximately perpendicular in reference to a direction of linear displacement of the brewing head (6).

5. A brewing assembly according to claim 2, wherein the coupling element of the brewing module (3) extends perpendicularly in reference to a linear direction of displacement of the brewing chamber (6a) over at least a width of the brewing chamber (6a).

6. A brewing assembly according to claim 2, wherein the coupling element of the brewing module (3) is made from metal.

7. A brewing assembly according to claim 1, wherein one of the closure elements (7a, 7b) is also embodied as an ejecting ram to eject used ground coffee from the brewing chamber (6a).

8. A brewing assembly according to claim 7, wherein in an ejection position the brewing head (6) and the closure element, embodied as the ejecting ram, are arranged at the brewing module (3) pivotal about a pivot axis aligned perpendicular in reference to the linear direction of displacement.

9. A brewing assembly according to claim 1, wherein the brewing module (3) is detachably connected to the drive unit (2).

10. A brewing assembly according to claim 1, wherein the brewing module (3) is detachably connected to the drive unit (2) for removal without tools being required.

11. A brewing assembly according to claim 1, wherein at least one of the brewing head (6), the upper closure element (7a), or the lower closure element (7b) are arranged on the brewing module (3) via a quick connect.

12. A brewing assembly according to claim 1, wherein at least one of the upper or the lower closure element (7b) comprises a fluid connection including a seal to connect to a fluid line.

13. A brewing assembly according to claim 1, wherein the drive unit (2) comprises two spindles, rotatable by the motor drive, said spindles are arranged parallel and spaced apart in reference to each other on the drive unit (2), and the brewing module (3) is arranged at least partially between the spindles (4a, 4b) in a detachable fashion.

14. A brewing assembly according to claim 1, wherein the brewing module (3) is essentially made from plastic.

15. A brewing assembly according to claim 14, wherein the upper and the lower closure elements (7b) as well as the brewing chamber (6a) are formed from plastic.

16. A coffee machine, comprising a water heating device, a coffee powder—supply unit, and the brewing assembly (1) according to claim 1, which are embodied cooperating such that in the brewing assembly (1) by feeding powdered coffee via the coffee powder—supply unit and heated water via the water heating unit a coffee drink can be produced.

17. A coffee machine according to claim 16, wherein the coffee machine comprises a control unit, which depending on the brewing module, selects at least one parameter for the preparation of coffee, the at least one parameter from the group including at least one of a coarseness, brewing pressure, brewing temperature, water supply amount during the brewing process, counter pressure during the compression of the ground coffee.

* * * * *